United States Patent Office 2,712,009
Patented June 28, 1955

2,712,009

PREPARATION OF HABIT-MODIFIED PROCAINE PENICILLIN

Sidney Alfred Vindin Deans, Rosemount, Quebec, and James Alexander Scarrow, Rosemere, Quebec, Canada, assignors, by mesne assignments, to American Home Products Corporation, New York, N. Y., a corporation of Delaware No Drawing. Application April 4, 1951,
Serial No. 219,321

4 Claims. (Cl. 260—239.1)

This invention relates to a process for the preparation of habit-modified crystalline procaine penicillin.

Procaine penicillin prepared by expedients now known in the art has been found to crystallize from solution in the form of elongated crystals in which the ratio of length to breadth may be as high as 6 to 1. These crystals are not readily converted to equidimensional particles by standard methods of comminution. Such procaine penicillin crystals have been prepared by reacting a salt of penicillin with a salt of procaine in the presence of water.

In the preparation of aqueous suspensions of procaine penicillin for intramuscular injection, it is desirable to have equidimensional rather than elongated crystalline particles.

APPLICANTS' DEVELOPMENT

The applicants have now found that it is possible to prepare procaine penicillin in which the crystals have a ratio of length to breadth approximately equal to 2 to 1, and which are more readily comminuted to equidimensional particles than the elongated crystals prepared by the methods of the prior art.

The applicants have found that a product of this type can be prepared by allowing a procaine salt and a penicillin salt to react in an aqeuous reaction medium at a temperature above 60° C.

At lower temperatures the resulting crystals of procaine penicillin are elongated, the ratio of length to breadth being as high as 6 to 1. At elevated temperatures, however, the procaine penicillin which separates from the aqeuous reaction medium consists of crystals whose ratio of length to breadth is in the neighbourhood of 2 to 1. Such crystals are more readily comminuted to equidimensional particles than the elongated crystals.

The function of the elevated temperature in the reaction carried out in an aqueous medium at 60° C. or higher is to modify the crystal habit of the procaine penicillin with the object of producing more or less equidimensional crystals or aggregates of such crystals instead of the elongated crystals obtained from an aqueous medium at room temperature. Such equidimensional crystals may be comminuted to produce more satisfactory crystalline particles for use in aqueous suspensions of procaine penicillin administered by intramuscular injection.

The preferred procaine salts used are for example, the hydrochloride, the acetate, the sulphate, the nitrate, and the phosphate.

Penicillins F, G, K and X may be used in the form of their potassium, sodium, ammonium or triethylamine salts.

Buffers, for example, sodium citrate, may be added to the reaction medium to stabilize the procaine penicillin.

EXAMPLES

The present invention will be more fully understood by referring to the following examples which should be taken in an illustrative sense only.

Example 1

A sterile solution consisting of 5 grams of crystalline potassium penicillin with a potency of 1550 units per mg. and 20 cc. of distilled water was heated to 65° C. To the solution was added with vigorous stirring a solution consisting of 4.7 grams of procaine acetate and 20 cc. of water preheated to 65° C. The mixture was stirred vigorously and cooled at approximately 5° C. per minute. Crystallization of the procaine penicillin began approixmately 45 seconds after the addition of the procaine acetate solution. The solution was maintained at 4° C. for 18 hours. The sterile procaine penicillin was separated by filtration under aseptic conditions, and washed in turn with sterile water, isopropanol and ether, precooled to 4° C. The product was dried under sterile conditions, the weight being 7.2 grams and the potency 1000 units per mg. The recovery was therefore 93%. The crystals ranged from 40 to 170 microns in length, the ratio of length to breadth being approximately 2 to 1. The crystals showed little if any tendency to form aggregates.

Similar results were obtained by using solutions of procaine nitrate, procaine sulphate and procaine phosphate instead of procaine acetate.

Example 2

A sterile solution consisting of 5 grams of crystalline potassium penicillin with a potency of 1550 units per mg. and 20 cc. of distilled water was heated to 65° C. To the solution was added with vigorous stirring a sterile solution consisting of 4 grams of procaine hydrochloride and 20 cc. of water, heated to 65° C. The mixture was stirred vigorously and cooled at approximately 5° C. per minute. Crystallization of the procaine penicillin began approximately 30 seconds after the addition of the procaine hydrochloride solution. The solution was maintained at 4° C. for 18 hours. The sterile procaine penicillin was separated by filtration using sterile technique and washed in turn with sterile water, isopropanol and ether, precooled to 4° C. The product was dried under sterile conditions, the weight being 7.35 grams and the potency 1000 units per mg. The recovery was therefore 95%. The crystals ranged from 30 to 140 microns in length, the ratio of length to breadth being approximately 2:1. The crystals showed little if any tendency to form aggregates.

We claim:

1. A process of preparing habit-modified procaine penicillin crystals having a ratio of length to breadth of approximately 2 to 1 which comprises bringing together a water-soluble salt of penicillin selected from the class consisting of the potassium, sodium, ammonium and triethylamine salts, and a water-soluble salt of procaine selected from the class consisting of the hydrochloride, acetate, sulfate, nitrate and phosphate salts, in an aqueous medium in the approximate range 60°–65° C., rapidly cooling the mixture, and separating therefrom precipitated procaine penicillin crystals having a ratio of length to breadth of approximately 2 to 1.

2. A process of preparing habit-modified procaine penicillin crystals having a ratio of length to breadth of approximately 2 to 1 which comprises adding an approximately 17–20 percent aqueous solution of a water-soluble procaine salt selected from the class consisting of the hydrochloride, acetate, sulfate, nitrate and phosphate salts, said solution being at a temperature of approximately 60°–65° C., to an equal volume of an approximately 20 percent water-soluble penicillin salt selected from the class consisting of the potassium, sodium, ammonium and triethylamine salts, said solution being also at a temperature of approximately 60°–65° C., while vigorously agitating the mixture, rapidly cooling the mixture at a rate of approximately 5° C. per minute permitting the cooled mixture to stand at a low temperature and recovering from it precipitated procaine-penicillin crystals having a ratio of length to breadth of approximately 2 to 1.

3. A process of preparing habit-modified procaine penicillin crystals, comprising reacting an aqueous solution of potassium penicillin heated at 60° C. with an aqueous solution of procaine acetate heated at 60° C., and removing from the mixture crystals of procaine penicillin having a length to breadth ratio of approximately 2 to 1.

4. A process as defined in claim 3, in which the procaine acetate is replaced by procaine hydrochloride.

References Cited in the file of this patent

UNITED STATES PATENTS

| | | |
|---|---|---|
| 2,515,898 | Rhodehamel | July 18, 1950 |
| 2,643,251 | Staab | June 23, 1953 |

FOREIGN PATENTS

| | | |
|---|---|---|
| 503,953 | Canada | June 29, 1954 |
| 654,279 | Great Britain | June 13, 1951 |
| 673,555 | Great Britain | June 11, 1950 |
| 681,140 | Great Britain | Oct. 15, 1952 |

OTHER REFERENCES

The Chemistry of Penicillin, Princeton U. Press, 1949, pp. 90 and 220.

Salivar et al., "J. Am. Chem. Soc.," vol. 70, March 1948, pp. 1287–88.